UNITED STATES PATENT OFFICE.

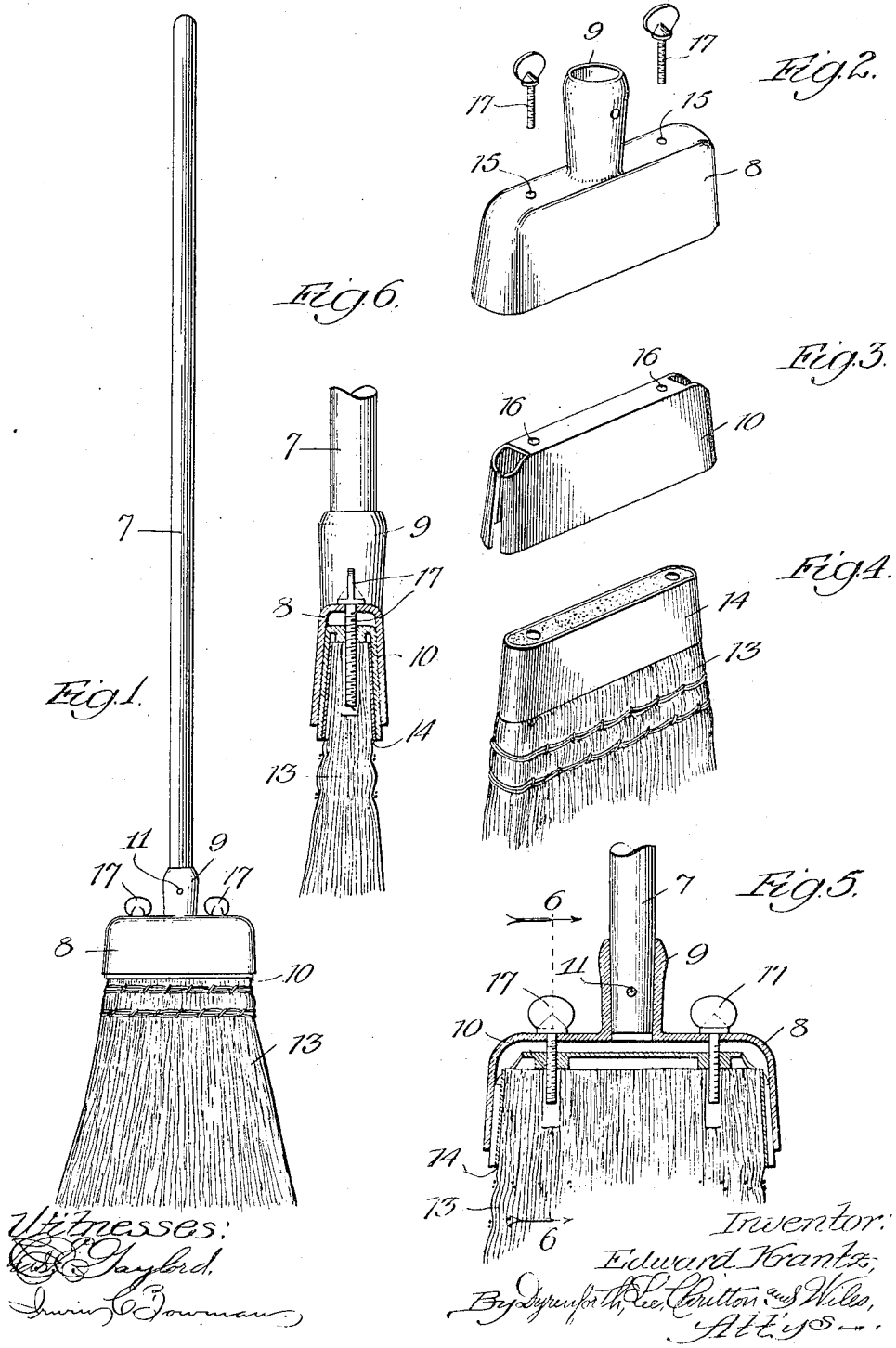

EDWARD KRANTZ, OF CHICAGO, ILLINOIS, ASSIGNOR OF ONE-HALF TO CHARLES H. EHRLICH, OF CHICAGO, ILLINOIS.

DETACHABLE BROOM-HANDLE.

1,289,816.  Specification of Letters Patent.  Patented Dec. 31, 1918.

Application filed December 5, 1917. Serial No. 205,492.

*To all whom it may concern:*

Be it known that I, EDWARD KRANTZ, a citizen of the United States, residing at Chicago, in the county of Cook and State of Illinois, have invented a new and useful Improvement in Detachable Broom-Handles, of which the following is a specification.

My invention relates to an improvement in the class of handles, with which such cleansing implements as brooms, brushes, mops, and the like, are provided.

The object of my improvement is to adapt the handle and head portion of the implement to be readily detached from each other and as readily connected in rigid relation, thereby to enable such head, when worn, to be removed for replacing it with a new one, and to enable a head of one kind, as that of a brush, to be substituted for another, as that of a broom or mop, thus to render the handle serviceable for a plurality of new heads of the same kind and for interchanged heads of different kinds in the class of implements to which my improvement relates.

The accompanying drawing illustrates my improvement in its application to a broom of the ordinary variety having a head of bunched broom-corn, that being the purpose for which I have more especially devised it; though I intend to be understood as covering herein my said improvement in connection with any implement of the aforesaid class to which it is applicable.

In the drawing, Figure 1 shows a broom in elevation, provided with my improved detachable handle; Fig. 2 is a perspective view of the outer socket showing, in disassembled relation thereto, set-screws as the means for tightening in the socket an expansible and contractible socket fittingly nesting therein; Fig. 3 is a perspective view of the expansible and contractible inner socket. showing it. as the outer socket is shown, in its preferred tapering form; Fig. 4 is a perspective view of a broken portion of a broom-head adapted to be detachably connected with my improved handle; Fig. 5 is an enlarged broken view illustrating my improvement mainly in section, and Fig. 6 is a section on line 6—6, Fig. 5.

The handle 7 shown is an ordinary wooden broomstick. A socket 8, preferably a metal casting and of the general tapering shape of the end of a broom-head to be confined in it, is provided with a central nipple 9, into which an end of the handle enters and is rigidly fastened thereto, as by a pin 11 (Fig. 5). In the socket 8 fits nestingly a head-clamping socket 10, preferably of the tapering shape of the outer socket and formed of sheet-metal with split or separated ends to render it elastic. The broom-head 13 is shown with its narrow end-portion enveloped in a suitable binding 14, as of cloth or adequately strong paper, to maintain that part of the head intact against mutilation in storage and handling, since such heads are intended to become an article of commerce obtainable by users of my detachable handle. In the closed end of the socket 8 are shown holes 15 at opposite sides of the nipple, to register with corresponding screw-holes 16 formed in thickened or boss-like sections of the closed end of the socket 10 to receive setscrews 17 serving the purpose hereinafter explained.

To apply a broom-head to my improved handle, the socket 10 may be first inserted partway into the socket 8, and the bound end of the head may be introduced into the contractible socket, whereupon the set-screws are inserted and turned to draw the inner into the outer socket, whereby the socket 10 is wedged into place and contracted to clamp it about the broomhead, which thus becomes rigidly secured to the handle. Obviously, to remove the head, it is only required to free the resilient socket from the set-screws and permit it with the broom-head, or the latter alone, to be withdrawn and another head to be substituted.

While my improvement adds comparatively little to the initial cost of the cleansing implement equipped therewith, that is saved over and over again by the saving of the handle, which is becoming an item of more and more expense because of the ever-increasing cost of the material of which it is formed. Moreover, the socket 8 adds ornamentally to the appearance of the implement and thus detracts from its ordinary unsightliness.

I realize that considerable variation is possible in the details of construction thus specifically shown and described, and I do not intend by illustrating a single or specific embodiment of my improvement to be limited thereto; my intention being in the following claims to claim protection upon all there may be of novelty in my invention as broadly as the state of the art will warrant.

I claim:

1. The combination with a broom or the like, of a detachable handle therefor comprising a hollow member having an outer rigid tapering socket, an inner elastic tapering socket fitting about the head of the broom and adapted to be introduced into said first-referred to socket, and releasable means for drawing said inner socket into said outer socket in close wedged contact therein to rigidly and detachably secure said parts together.

2. A detachable broom and like cleaning-implement handle, comprising a handle having an outer tapering metal socket on one end, an inner tapering and elastic sheet-metal socket having split ends, to receive the end of the implement-head to be introduced therein and to nest wedgedly within the outer socket, and means for drawing into and releasably fastening in said outer socket said inner socket to clamp the latter about the head and detachably secure it and the handle together.

3. A detachable broom and like cleansing-implement handle, comprising a handle having an outer tapering metal socket on one end, an inner tapering and elastic sheet-metal socket having split ends, fitting about the end of the implement-head to be introduced therein and nesting wedgedly within the outer socket, and set-screws working through the narrower outer-socket end in the corresponding end of the inner socket to draw into and releasably fasten the latter in the outer socket and clamp the inner socket about said head for detachably securing it and the handle together.

EDWARD KRANTZ.

Copies of this patent may be obtained for five cents each, by addressing the "Commissioner of Patents, Washington, D. C."